US007480757B2

(12) United States Patent  
Atherton et al.

(10) Patent No.: US 7,480,757 B2
(45) Date of Patent: Jan. 20, 2009

(54) METHOD FOR DYNAMICALLY ALLOCATING LANES TO A PLURALITY OF PCI EXPRESS CONNECTORS

(75) Inventors: William E. Atherton, Hillsborough, NC (US); Marcus A. Baker, Apex, NC (US); Eric R. Kern, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 198 days.

(21) Appl. No.: 11/420,078

(22) Filed: May 24, 2006

(65) Prior Publication Data

US 2007/0276981 A1 Nov. 29, 2007

(51) Int. Cl.
*G06F 13/00* (2006.01)
(52) U.S. Cl. ....................... 710/313; 710/307
(58) Field of Classification Search ............. 710/313, 710/307
See application file for complete search history.

(56) References Cited

U.S. PATENT DOCUMENTS

| 5,961,352 | A | 10/1999 | Denny et al. | |
|---|---|---|---|---|
| 6,179,664 | B1 | 1/2001 | Tung et al. | |
| 6,591,320 | B1 | 7/2003 | Cheston et al. | |
| 7,136,953 | B1 * | 11/2006 | Bisson et al. | 710/307 |
| 7,174,411 | B1 * | 2/2007 | Ngai | 710/316 |
| 2002/0023187 | A1 | 2/2002 | Chang et al. | |
| 2002/0129208 | A1 | 9/2002 | Barroso et al. | |
| 2004/0093411 | A1 | 5/2004 | Elzur et al. | |
| 2004/0184409 | A1 | 9/2004 | Schoenborn et al. | |
| 2004/0210678 | A1 | 10/2004 | Pettey et al. | |
| 2004/0225772 | A1 | 11/2004 | Eichler, Jr. et al. | |
| 2005/0027906 | A1 | 2/2005 | Peterson et al. | |
| 2005/0033893 | A1 | 2/2005 | Pettey et al. | |
| 2005/0038947 | A1 | 2/2005 | Lueck et al. | |
| 2005/0270988 | A1 * | 12/2005 | DeHaemer | 370/254 |
| 2006/0112210 | A1 * | 5/2006 | Tseng | 710/307 |
| 2006/0294279 | A1 * | 12/2006 | McKee et al. | 710/301 |
| 2007/0038794 | A1 * | 2/2007 | Purcell et al. | 710/306 |
| 2007/0094437 | A1 * | 4/2007 | Jabori et al. | 710/307 |
| 2007/0139423 | A1 * | 6/2007 | Kong et al. | 345/502 |
| 2007/0214301 | A1 * | 9/2007 | Chen | 710/301 |
| 2007/0294454 | A1 * | 12/2007 | Danilak | 710/305 |

* cited by examiner

*Primary Examiner*—Glenn A Auve
(74) *Attorney, Agent, or Firm*—H. Artoush Ohanian; Cynthia S. Byrd; Biggers & Ohanian, LLP

(57) ABSTRACT

A method for dynamically allocating lanes to a plurality of PCI Express connectors is disclosed that may comprise identifying whether a PCI Express device is installed into each PCI Express connector, identifying historic data traffic for each PCI device installed into the plurality of PCI Express connectors, and assigning a portion of the lanes to each PCI Express connector having a PCI Express device installed into the PCI Express connector. The method may also comprise identifying a device type for each PCI Express device installed into the plurality of PCI Express connectors. Moreover, the method may comprise creating allocation rules that specify the allocation of lanes to the plurality of PCI Express connectors. Furthermore, the method may comprise receiving user allocation preferences that specify the allocation of lanes to the plurality of PCI Express connectors.

4 Claims, 10 Drawing Sheets

METHOD FOR DYNAMICALLY ALLOCATING LANES TO A PLURALITY OF PCI EXPRESS CONNECTORS

BACKGROUND OF THE INVENTION

1. Field of the Invention

The field of the invention is data processing, or, more specifically, methods, apparatus, and products for dynamically allocating lanes to a plurality of PCI Express connectors.

2. Description of Related Art

A PCI Express bus is an implementation of the Peripheral Components Interconnect ('PCI') computer bus according to the set of PCI Express specifications promulgated by the PCI Special Interest Group ('PCI SIG'). A PCI Express bus uses existing PCI programming and software concepts, but is based on a different and much faster serial physical-layer communications protocol. The physical-layer consists not of a bus, but of a network of serial interconnections extending to each device from a switch. The switch provides point-to-point communications between devices connected to the switch. Devices and switches operating according to the PCI Express specifications are generally referred to as 'PCI Express devices' and 'PCI Express switches' respectively.

A connection between any two PCI Express devices is referred to as a 'link.' A link consists of a collection of one or more lanes used for data communications between devices. Each lane is a set of two unidirectional low voltage differential signaling pairs of transmission pathways such as, for example, traces along a motherboard. Because transmitting data and receiving data are implemented using separate differential pairs, each lane allows for full-duplex serial data communication of up to five gigabits of data per second.

All devices must minimally support single-lane links. PCI Express devices may optionally support wider links composed of two, four, eight, twelve, sixteen, or thirty-two lanes by providing additional pins on the hardware interface of the device that plug into a PCI Express connector. A PCI Express connector is a connector manufactured according to the PCI Express specifications and may physically support connections for one, two, four, eight, twelve, sixteen, or thirty-two lanes in a manner similar to PCI Express devices. A PCI Express device may install into any PCI Express connector that physically supports the same or a greater number of lanes as the lanes physically supported by the PCI Express device. For example, a PCI Express device physically supporting eight lanes may be installed in to a PCI Express connector physically supporting eight, twelve, sixteen, or thirty-two lanes. Such an eight lane PCI Express device, however, cannot be physically installed in a one, two, or four lane PCI Express connector.

Although a PCI Express device and the PCI Express connector into which the device is installed may physically support links with up to thirty-two lanes, a PCI Express device may utilize fewer lanes for data communication than the maximum number of lanes physically supported by the device and the connector. For example, a PCI Express device may physically support eight lanes and be installed in a PCI Express connector physically supporting sixteen lanes. The eight lane PCI Express device may, however, only utilize one, two, or four of those eight lanes it supports for data communications with other PCI Express devices. The number of lanes actually utilized for the data communications link between two devices is typically the highest number of lanes mutually supported by the devices.

The current chipsets implementing the PCI Express switch that provides the point-to-point communications between devices typically support seventeen physical lanes. On workstations, these seventeen lanes provided by the PCI Express switch are typically connected to two PCI Express connectors: a sixteen lane connector and a one lane connector. Often, a high end video graphics adapter is installed in the sixteen lane PCI Express connector and some other PCI Express device is installed in the one lane PCI Express connector. Such a configuration works well in computer systems where the performance of the video graphics adapter is most important. In other computer systems, however, other allocations of the seventeen physical lanes may be preferred. In a server system, for example, allocating the seventeen lanes to three or more PCI Express connectors may be preferred to provide the server system with one connector for installing a video adapter and two or more connectors to provide redundant network adapters or redundant storage drive adapters. That is, in the server configuration, computer architects prefer to have more PCI Express connectors connecting to the switch that provide redundancy over the workstation configuration that provides a single high-bandwidth PCI Express connector. Although the same chipset is used to implement the seventeen lane PCI Express switch in either the workstation or server configuration, the number of PCI Express connectors and the electrical connections between the connectors and the switch are different for the workstation configuration and the server configuration. Because of the contrasting requirements of these two configurations, these two configurations cannot currently coexist on the same motherboard.

SUMMARY OF THE INVENTION

A method for dynamically allocating lanes to a plurality of PCI Express connectors is disclosed that may comprise identifying whether a PCI Express device is installed into each PCI Express connector, identifying historic data trafic for each PCI device installed into the plurality of PCI Express connectors, and assigning a portion of the lanes to each PCI Express connector having a PCI Express device installed into the PCI Express connector. The method may also comprise identifying a device type for each PCI Express device installed into the plurality of PCI Express connectors. Moreover, the method may comprise creating allocation rules that specify the allocation of lanes to the plurality of PCI Express connectors. Furthermore, the method may comprise receiving user allocation preferences that specify the allocation of lanes to the plurality of PCI Express connectors.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
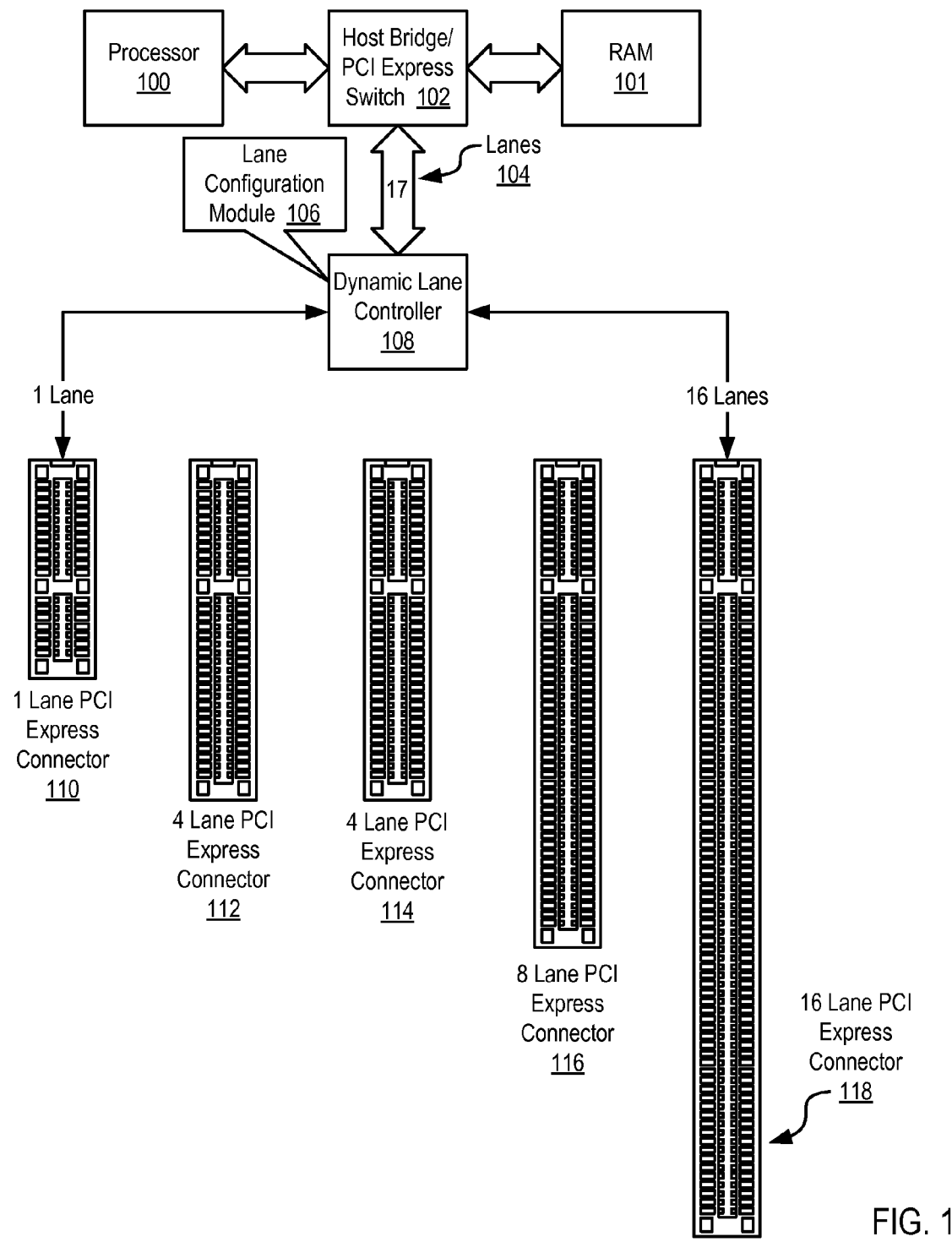
FIG. 1 sets forth a block diagram illustrating an exemplary system for dynamically allocating lanes to a plurality of PCI Express connectors according to embodiments of the present invention.

Exemplary methods, systems, and products for dynamically allocating lanes to a plurality of PCI Express connectors according to embodiments of the present invention are described with reference to the accompanying drawings, beginning with FIG. 1. FIG. 1 sets forth a block diagram illustrating an exemplary system for dynamically allocating lanes to a plurality of PCI Express connectors according to embodiments of the present invention. All of the components in the exemplary system of FIG. 1 are installed upon a motherboard of a computer. The system of FIG. 1 operates generally to dynamically allocate lanes to a plurality of PCI Express connectors according to embodiments of the present invention by identifying whether a PCI Express device is installed into each PCI Express connector, and assigning a portion of the lanes to each PCI Express connector having a PCI Express device installed into the PCI Express connector.

The exemplary system of FIG. 1 includes a plurality of PCI Express connectors (110, 112, 114, 116, 118) in which PCI Express devices may be installed. A PCI Express device is referred to as 'installed' in a PCI Express connector when the device is plugged into the connector and electrically connects to at least one lane provided by the connector according to the PCI Express specifications. As mentioned above, a lane is a set of two unidirectional low voltage differential signaling pairs of transmission pathways. Each connector (110, 112, 114, 116, 118) of FIG. 1 is a connector designed according to the PCI Express specifications and capable of supporting a number of lanes extending from a PCI Express switch. The PCI Express connector (110) supports a maximum of one lane between the connector (110) and the PCI Express switch (102). The PCI Express connectors (112, 114) support a maximum of four lanes between each connector (112, 114) and the PCI Express switch (102). The PCI Express connector (116) supports a maximum of eight lanes between the connector (116) and the PCI Express switch (102). The PCI Express connector (118) supports a maximum of sixteen lanes between the connector (118) and the PCI Express switch (102). The PCI Express connectors (110, 112, 114, 116, 118) useful for dynamically allocating lanes to a plurality of PCI Express connectors according to embodiments of the present invention may be implemented using the 6325 PCI Express Card Edge Connectors from the AVX Corporation or the Standard Edge 0.050 Series PCI Express Connectors from Tyco Electronics.

The exemplary system of FIG. 1 also includes a host bridge/PCI Express switch (102) connected to a computer processor (100) and random access memory ('RAM') (101). The host bridge/PCI Express switch (102) of FIG. 1 is a computer hardware chipset that handles communications between the components of a computer system such as, for example, a computer processor, RAM, non-volatile memory, power management components, the real-time system clock, PCI Express devices, and so on. The host bridge/PCI Express switch (102) of FIG. 1 communicates with PCI Express devices installed in the PCI Express connectors (110, 112, 114, 116, 118) using lanes (104) configured according to the PCI Express specification. In the example of FIG. 1, the host bridge/PCI Express switch (102) provides seventeen lanes (104) that are allocated to the PCI Express connectors (110, 112, 114, 116, 118) by a dynamic lane controller (108).

The exemplary system of FIG. 1 also includes a dynamic lane controller (108). The dynamic lane controller (108) is automated computing machinery that allocates lanes (104) provided by the host bridge/PCI Express switch (102) to a plurality of PCI Express connectors. The dynamic lane controller (108) of FIG. 1 has installed upon it a lane configuration module (106). The lane configuration module (106) of FIG. 1 is a set of computer program instructions improved for dynamically allocating lanes to a plurality of PCI Express connectors according to embodiments of the present invention. The lane configuration module (106) of FIG. 1 operates generally for dynamically allocating lanes to a plurality of PCI Express connectors according to embodiments of the present invention by identifying whether a PCI Express device is installed into each PCI Express connector and assigning a portion of the lanes to each PCI Express connector having a PCI Express device installed into the PCI Express connector. In the example of FIG. 1, the dynamic lane controller (108) may be implemented as an application specific integrated circuit.

FIG. 1 illustrates a specific example of a dynamic lane controller dynamically allocate lanes to a plurality of PCI Express connectors according to embodiments of the present invention. In the exemplary system of FIG. 1, the dynamic lane controller (108) allocates one lane to the PCI Express connector (110) and allocates sixteen lanes to the PCI Express connector (118). The dynamic lane controller (108) of FIG. 1, however, does not allocate any portion of the lanes (104) to the PCI Express connectors (112, 114, 116). The dynamic lane controller (108) operates for dynamically allocating lanes to a plurality of PCI Express connectors according to the methods described below with reference to FIGS. 6-10.

When the dynamic lane controller (108) allocates the lanes (104) to the connectors (110, 112, 114, 116, 118), the host bridge/PCI Express switch (102) communicates with the PCI Express devices installed in the connectors (110, 112, 114, 116, 118) to determine how many of the lanes allocated to each connector (110, 112, 114, 116, 118) are actually utilized in the data communications connection between the host bridge/PCI Express switch (102) and the devices installed in the connectors (110, 112, 114, 116, 118). In the specific example of FIG. 1, the dynamic lane controller (108) allocates sixteen lanes of the seventeen lanes (104) to PCI Express connector (118). The host bridge/PCI Express switch (102) and the device installed in connector (118) may, however, only utilize eight of the lanes for data communications. The number of lanes provided to each connector (110, 112, 114, 116, 118) by the dynamic lane controller (108) that the host bridge/PCI Express switch (102) and the device installed in each connector actually utilize for data communications is negotiated between the host bridge/PCI Express switch (102) and the device according to the PCI specification.

As mentioned above, the dynamic lane controller (108) of FIG. 1 allocates the seventeen lanes (104) from the host bridge/PCI Express switch (102) to two PCI Express connectors (110, 118). The dynamic lane controller (108) allocates one lane to connector (110) and sixteen lanes to connector (118). Such an allocation, therefore, only provides data communications with the host bridge/PCI Express switch (102) to only two PCI Express devices. Readers will note that the allocation depicted in FIG. 1 is for explanation and not for limitation. The dynamic lane controller (108) may allocate the lanes provided by the host bridge/PCI Express switch (102) to the connectors (110, 112, 114, 116, 118) in other configurations to advantageously provide data communications to more than two PCI Express devices. For further explanation, therefore, FIG. 2 sets forth a block diagram illustrating an exemplary system for dynamically allocating lanes to a plurality of PCI Express connectors according to embodiments of the present invention in which a dynamic land controller (108) allocates lanes to three PCI Express connectors. The system of FIG. 2 operates generally to dynamically allocate lanes to a plurality of PCI Express connectors according to embodiments of the present invention by identifying whether a PCI Express device is installed into each PCI Express connector, and assigning a portion of the lanes to each PCI Express connector having a PCI Express device installed into the PCI Express connector.

Figure 2:
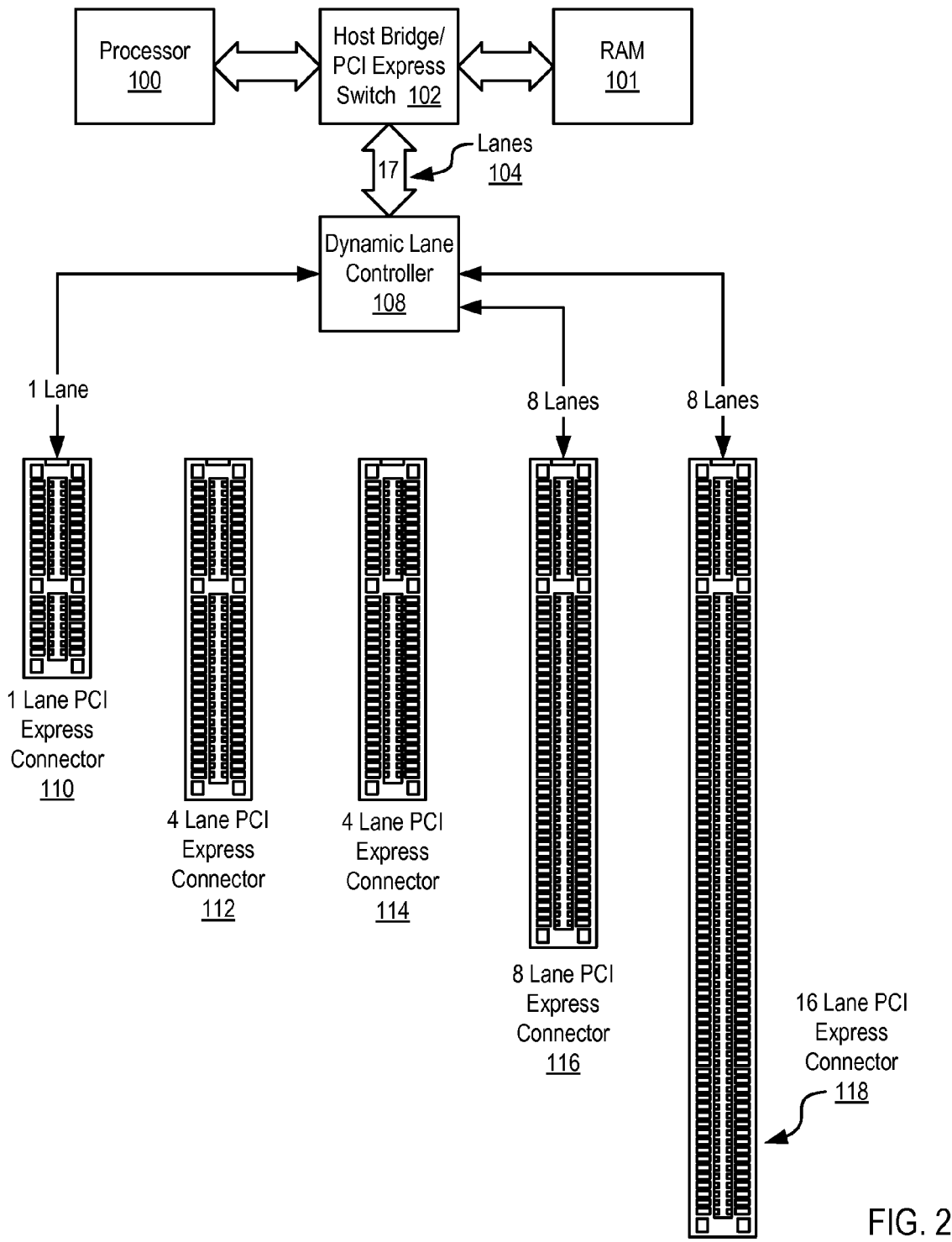
FIG. 2 sets forth a block diagram illustrating an exemplary system for dynamically allocating lanes to a plurality of PCI Express connectors according to embodiments of the present invention.

The system of FIG. 2 is similar to the system of FIG. 1. That is, the system of FIG. 2 is similar to the system of FIG. 1 in that the system of FIG. 2 includes PCI Express connectors (110, 112, 114, 116, 118), dynamic lane controller (108), lanes (104), host bridge/PCI Express switch (102), processor (100), and RAM (101). The system of FIG. 2 is different than the system of FIG. 1 in that the dynamic lane controller (108) of FIG. 2 allocates one lane to the PCI Express connector (110) and allocates eight lanes to the PCI Express connectors (116, 118). The dynamic lane controller (108) of FIG. 2 does not allocate any portion of the lanes (104) to the PCI Express connectors (112, 114). The dynamic lane controller (108) operates for dynamically allocating lanes to a plurality of PCI Express connectors according to the methods described below with reference to FIGS. 6-10.

Readers will note that the dynamic lane controller (108) only allocates eight lanes to the PCI Express connector (118) capable of providing sixteen lanes to a device installed in the connector (118). The PCI Express specifications allows for such an allocation because the PCI Express specification supports 'up-plugging.' That is, the PCI Express specification supports plugging a device having an eight lane form factor into a connector having a sixteen lane form factor. In addition, the PCI Express specification supports a device having a sixteen lane form factor utilizing only 8 lanes for data communications.

The exemplary systems of FIGS. 1 and 2 depicts a dynamic lane controller allocating lanes in such a manner that only provides data communications with the host bridge/PCI Express switch (102) to two or three PCI Express devices. Dynamic lane controllers operating according to embodiments of the present invention may, however, provide data communications with the host bridge/PCI Express switch (102) to four PCI Express devices. For further explanation, FIG. 3 sets forth a block diagram illustrating an exemplary system for dynamically allocating lanes to a plurality of PCI Express connectors according to embodiments of the present invention in which a dynamic land controller (108) allocates lanes to four PCI Express connectors. The system of FIG. 3 operates generally to dynamically allocate lanes to a plurality of PCI Express connectors according to embodiments of the present invention by identifying whether a PCI Express device is installed into each PCI Express connector, and assigning a portion of the lanes to each PCI Express connector having a PCI Express device installed into the PCI Express connector.

Figure 3:
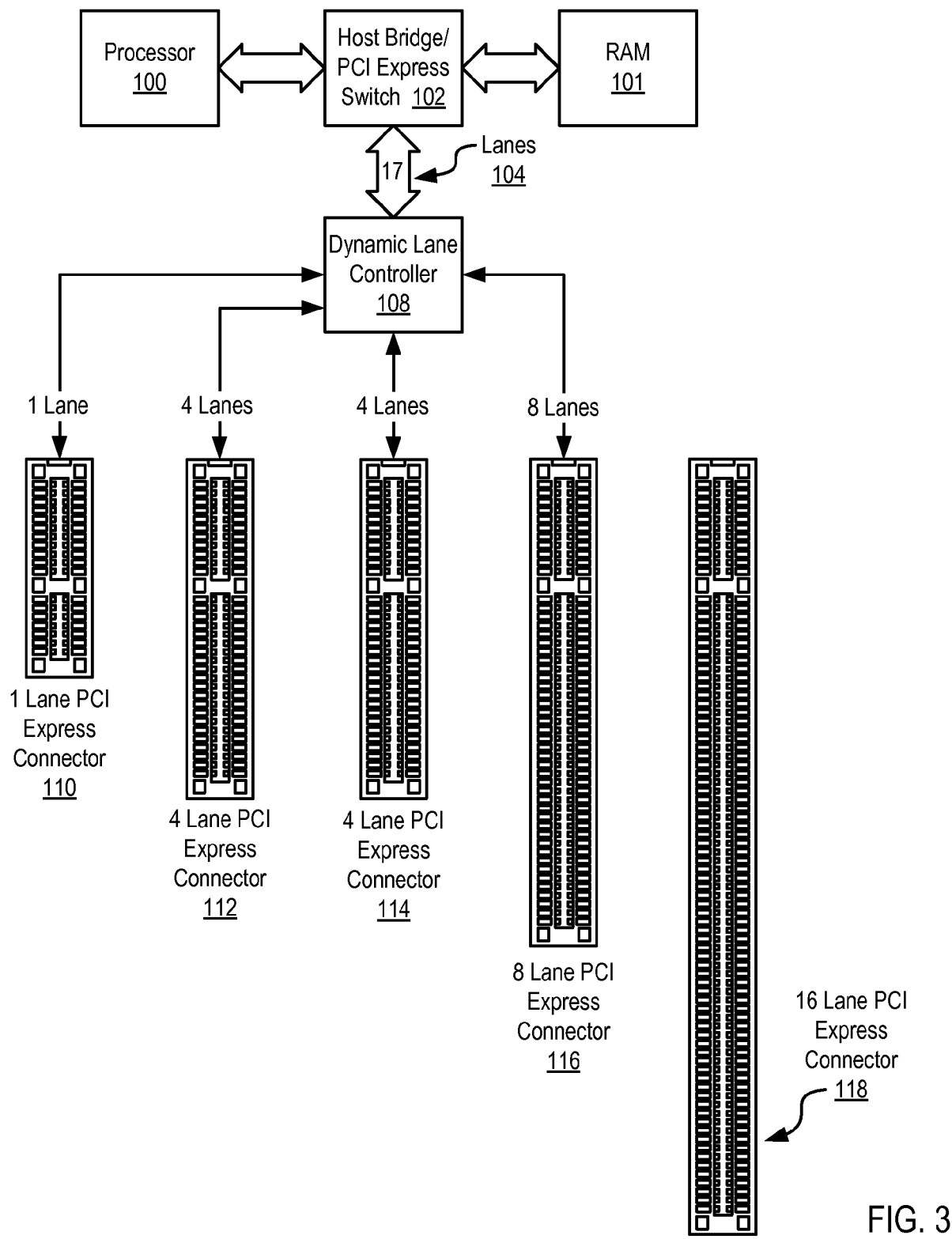
FIG. 3 sets forth a block diagram illustrating an exemplary system for dynamically allocating lanes to a plurality of PCI Express connectors according to embodiments of the present invention.

The system of FIG. 3 is similar to the system of FIG. 1. That is, the system of FIG. 3 is similar to the system of FIG. 1 in that the system of FIG. 3 includes PCI Express connectors (110, 112, 114, 116, 118), dynamic lane controller (108), lanes (104), host bridge/PCI Express switch (102), processor (100), and RAM (101). The system of FIG. 3 is different than the system of FIG. 1 in that the dynamic lane controller (108) of FIG. 3 allocates one lane to the PCI Express connector (110), allocates four lanes to the PCI Express connectors (112, 114), and allocates eight lanes to PCI Express connector (116). The dynamic lane controller (108) of FIG. 3 does not allocate any portion of the lanes (104) to the PCI Express connector (118). The dynamic lane controller (108) operates for dynamically allocating lanes to a plurality of PCI Express connectors according to the methods described below with reference to FIGS. 6-10.

The exemplary systems of FIGS. 1, 2, and 3 depict a dynamic lane controller allocating lanes in such a manner that only provides data communications with the host bridge/PCI Express switch (102) to two, three, or four PCI Express devices. Dynamic lane controllers operating according to embodiments of the present invention may, however, provide data communications with the host bridge/PCI Express switch (102) to five or more PCI Express devices. For further explanation, FIG. 4 sets forth a block diagram illustrating an exemplary system for dynamically allocating lanes to a plurality of PCI Express connectors according to embodiments of the present invention in which a dynamic land controller (108) allocates lanes to five PCI Express connectors. The system of FIG. 4 operates generally to dynamically allocate lanes to a plurality of PCI Express connectors according to embodiments of the present invention by identifying whether a PCI Express device is installed into each PCI Express connector, and assigning a portion of the lanes to each PCI Express connector having a PCI Express device installed into the PCI Express connector.

Figure 4:
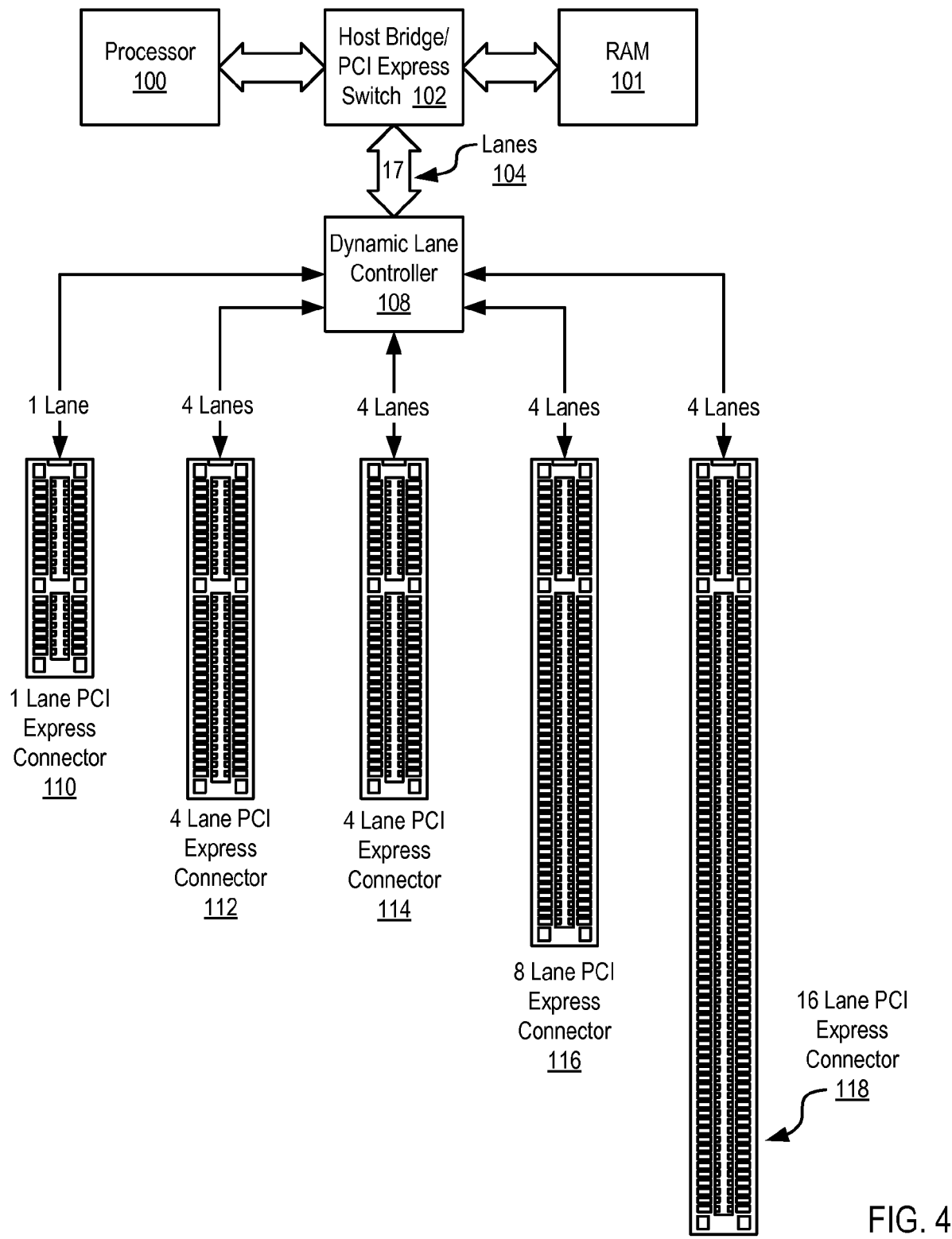
FIG. 4 sets forth a block diagram illustrating an exemplary system for dynamically allocating lanes to a plurality of PCI Express connectors according to embodiments of the present invention.

The system of FIG. 4 is similar to the system of FIG. 1. That is, the system of FIG. 4 is similar to the system of FIG. 1 in that the system of FIG. 4 includes PCI Express connectors (110, 112, 114, 116, 118), dynamic lane controller (108), lanes (104), host bridge/PCI Express switch (102), processor (100), and RAM (101). The system of FIG. 4 is different than the system of FIG. 1 in that the dynamic lane controller (108) of FIG. 4 allocates one lane to the PCI Express connector (110) and allocates four lanes to each of the PCI Express connectors (112, 114, 116, 118). The dynamic lane controller (108) operates for dynamically allocating lanes to a plurality of PCI Express connectors according to the methods described below with reference to FIGS. 6-10.

As mentioned above, the dynamic lane controller operating in accordance with the present invention is generally implemented with automated computing machinery such as, for example, an application specific integrated circuit. For further explanation, therefore, FIG. 5 sets forth a block diagram of automated computing machinery comprising an application specific integrated circuit (152) useful in dynamically allocating lanes to a plurality of PCI Express connectors according to embodiments of the present invention. The application specific integrated circuit ('ASIC') (152) of FIG. 5 includes at least one ASIC processor (156) as well as random access memory (168) ('RAM') which is connected through an ASIC bus (160) to ASIC processor (156) and to other components of the ASIC (152).

Stored in RAM (168) is a lane configuration module (106). The lane configuration module (106) is a set of computer program instructions improved for dynamically allocating lanes to a plurality of PCI Express connectors according to embodiments of the present invention. The lane configuration module (106) operates generally for dynamically allocating lanes to a plurality of PCI Express connectors according to embodiments of the present invention by identifying whether a PCI Express device is installed into each PCI Express connector and assigning a portion of the lanes to each PCI Express connector having a PCI Express device installed into the PCI Express connector.

Figure 5:
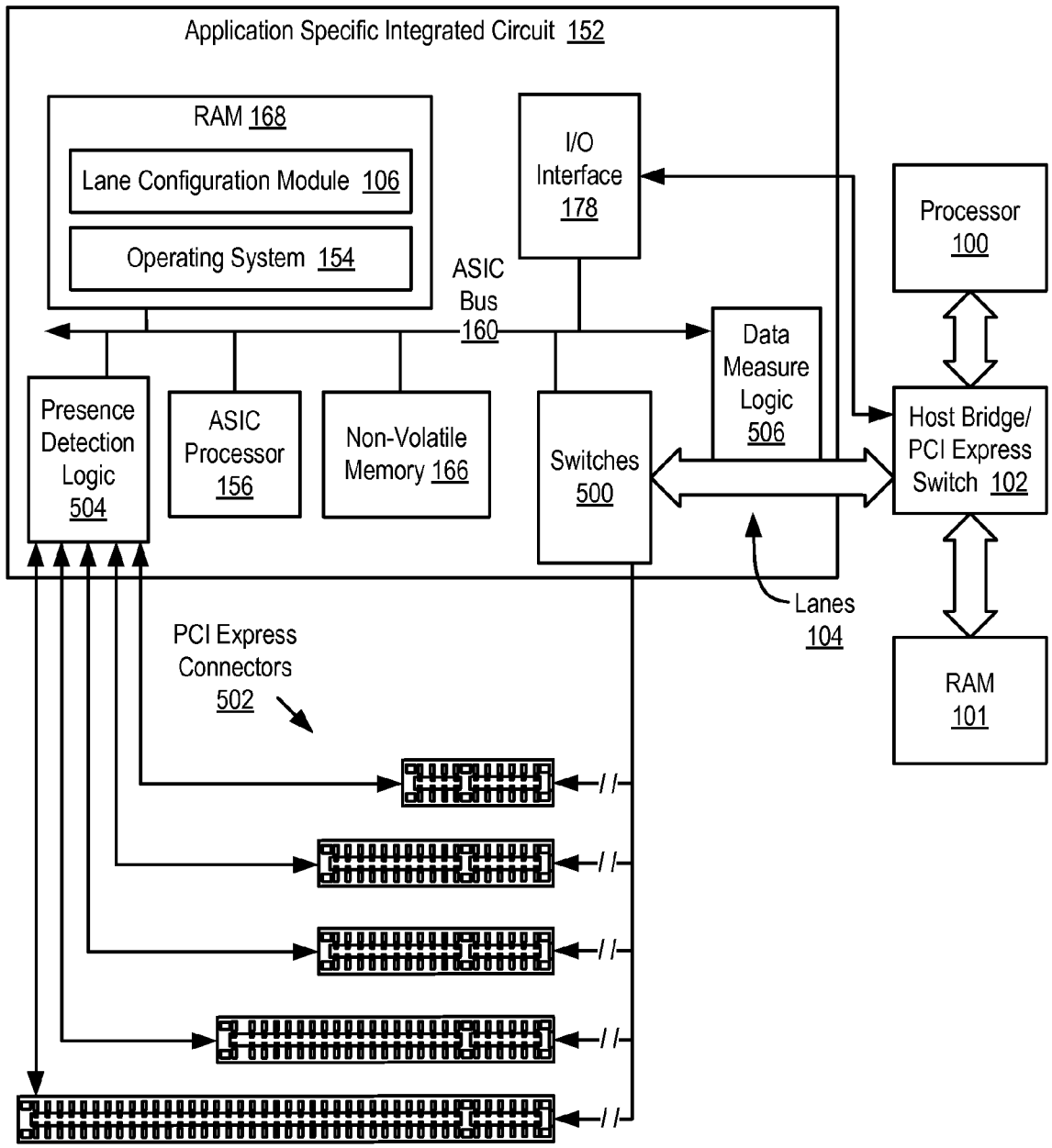
FIG. 5 sets forth a block diagram of automated computing machinery comprising an application specific integrated circuit useful in dynamically allocating lanes to a plurality of PCI Express connectors according to embodiments of the present invention.

Also stored in RAM (168) is an operating system (154). Operating systems useful in computers according to embodiments of the present invention include UNIX™, Linux™, Microsoft XP™, AIX™, IBM's i5/OS™, and others as will occur to those of skill in the art. The operating system (154) and the lane configuration module (106) in the example of FIG. 5 are shown in RAM (168), but many components of such software typically are stored in non-volatile memory (166) also. The non-volatile computer memory (166) may be implemented as electrically erasable programmable read-only memory space (so-called 'EEPROM' or 'Flash' memory) or as any other kind of non-volatile computer memory as will occur to those of skill in the art.

The exemplary ASIC (152) of FIG. 5 also includes switches (500). The switches (500) are computer hardware such as, for example, multiplexers that configure the transmission pathways between the host bridge/PCI Express switch (102) and the PCI Express connectors (502). By manipulating the transmission pathways between the host bridge/PCI Express switch (102) and the PCI Express connectors (502), the switches (500) may assign a portion of the lanes (104) to each PCI Express connector having a PCI Express device installed in the PCI Express connector. As discussed above, the host bridge/PCI Express switch (102) is a computer hardware chipset that handles communications between the components of a computer system such as, for example, a computer processor (100) and RAM (101).

The exemplary ASIC (152) of FIG. 5 also includes presence detection logic (504). The presence detection logic (504) is computer hardware that detects when a PCI Express device is installed in one of the PCI Express connectors (502). The presence detection logic (504) connects to the 'PRSNT#1' pin of each PCI Express connector (502). The 'PRSNT#1' pin is a hot-plug present detection pin present in all of the PCI Express connectors (502).

The exemplary ASIC (152) of FIG. 5 also includes data measurement logic (506). The data measurement logic (506) is computer hardware for measuring the number of data packets transmitted through each lane (104) used for data communications between a PCI Express device installed in one of the PCI Express connectors (502) and the host bridge/PCI Express switch (102). The data measurement logic (506) is connected to the other components of the ASIC (152) through the ASIC (152) bus (160).

The exemplary ASIC (152) of FIG. 5 also includes one or more input/output interface adapters (178) connected to the host bridge/PCI Express switch (102). The input/output interface adapters (178) in the ASIC implement data communications with other components connected to the host bridge/PCI Express switch (102) of a computer system. Other components connected to the host bridge/PCI Express switch (102) of a typical computer system may include, for example, a computer processor, RAM, non-volatile memory, power management components, the real-time system clock, PCI Express devices, other computer bus adapters, and so on.

Readers will note that the ASIC illustrated in FIG. 5 that implements a dynamic lane controller useful for allocating lanes to a plurality of PCI Express connectors according to embodiments of the present invention is for explanation and not for limitation. In fact, a dynamic lane controller operating according to embodiments of the present invention may be implemented in an ASIC having only control logic for operating switches (500) that connect the transmission pathways between a PCI Express switch and PCI Express connectors. A general purpose microcontroller or the microprocessor installed on a motherboard may be utilized to control such an exemplary ASIC when the computer system initializes. Readers will note that there is no requirement that the ASIC implementing a dynamic lane controller provide all of the functionality described with reference to FIG. 5. Because a dynamic lane controller is typically installed on a motherboard that provides computer processing, computer memory, and other computing resources, the functionality provided by the ASIC (152) of FIG. 5 may be implemented using the other computing resources available through the motherboard.

Figure 6:
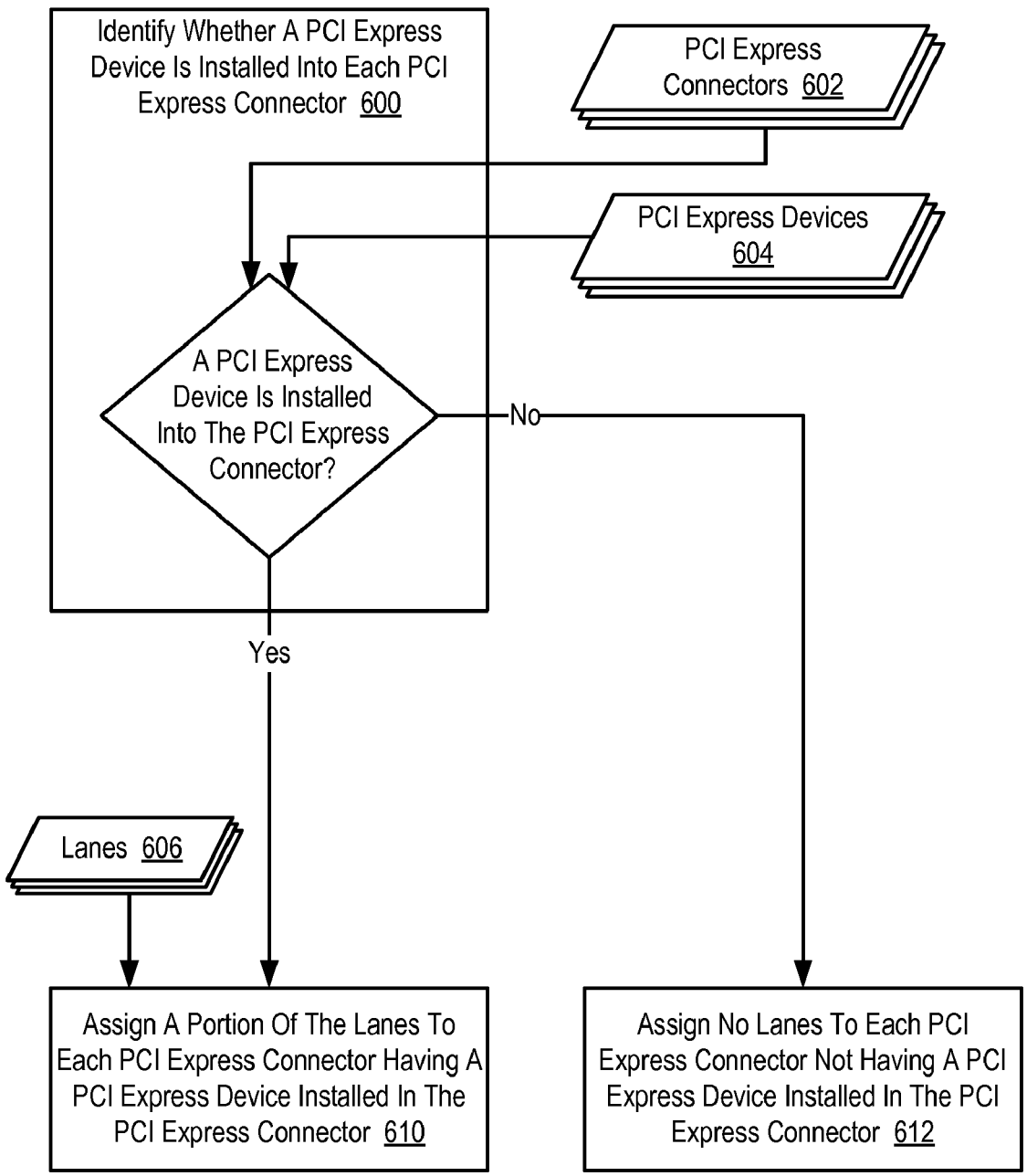
FIG. 6 sets forth a flow chart illustrating an exemplary method for dynamically allocating lanes to a plurality of PCI Express connectors according to embodiments of the present invention.

For further explanation, FIG. 6 sets forth a flow chart illustrating an exemplary method for dynamically allocating lanes (606) to a plurality of PCI Express connectors according to embodiments of the present invention. The method of FIG. 6 includes identifying (600) whether a PCI Express device (604) is installed into each PCI Express connector (602). The PCI Express connectors (602) of FIG. 6 may be implemented with connectors that conform the PCI Express specifications. The PCI Express devices (604) of FIG. 6 may be implemented with devices that conform to the PCI Express specifications.

In the method of FIG. 6, identifying (600) whether a PCI Express device (604) is installed into each PCI Express connector (602) may be carried out by determining, for each PCI Express connector (602) installed in a computer system, whether a PCI Express device (604) is installed in the PCI Express connector. Determining, for each PCI Express connector (602) installed in a computer system, whether a PCI Express device (604) is installed in the PCI Express connector may be carried out by sampling the 'PRSNT#1' pin of each connector when computer system performs the power-on self test ('POST'). The 'PRSNT#1' pin is a hot-plug present detection pin present in all PCI Express connectors.

The method of FIG. 6 also includes assigning (610) a portion of the lanes (606) to each PCI Express connector (602) having a PCI Express device (604) installed into the PCI Express connector (602). Each of the lanes (606) represents a set of two unidirectional low voltage differential signaling pairs of transmission pathways implementing data communications according to the PCI Express specifications. In the method of FIG. 6, assigning (610) a portion of the lanes (606) to each PCI Express connector (602) having a PCI Express device (604) installed into the PCI Express connector (602) may be carried out by assigning the lanes to each PCI Express connector in dependence upon the identified device types, assigning the lanes to each PCI Express connector in dependence upon the allocation rules, assigning the lanes to each PCI Express connector in dependence upon the user allocation preferences, or assigning the lanes to each PCI Express connector in dependence upon the historic data traffic as discussed below with reference to FIGS. 7, 8, 9, and 10.

The method of FIG. 6 also includes assigning (612) no lanes (606) to each PCI Express connector (602) not having a PCI Express device (604) installed into the PCI Express connector (602). The PCI Express connectors (602) not having a PCI Express device (604) installed into the PCI Express connector (602) typically have no occasion to communicate data to a PCI Express switch. Assigning lanes (606) to such connectors having no devices installed in the connectors would, therefore, reduce the utilization of system resources.

As mentioned above, assigning a portion of the lanes to each PCI Express connector having a PCI Express device installed into the PCI Express connector may be carried out by assigning the lanes to each PCI Express connector in dependence upon the identified device types. For further explanation, therefore, FIG. 7 sets forth a flow chart illustrating a further exemplary method for dynamically allocating lanes to a plurality of PCI Express connectors according to embodiments of the present invention that includes assigning (702) the lanes (606) to each PCI Express connector (602) in dependence upon the identified device types (704).

Figure 7:
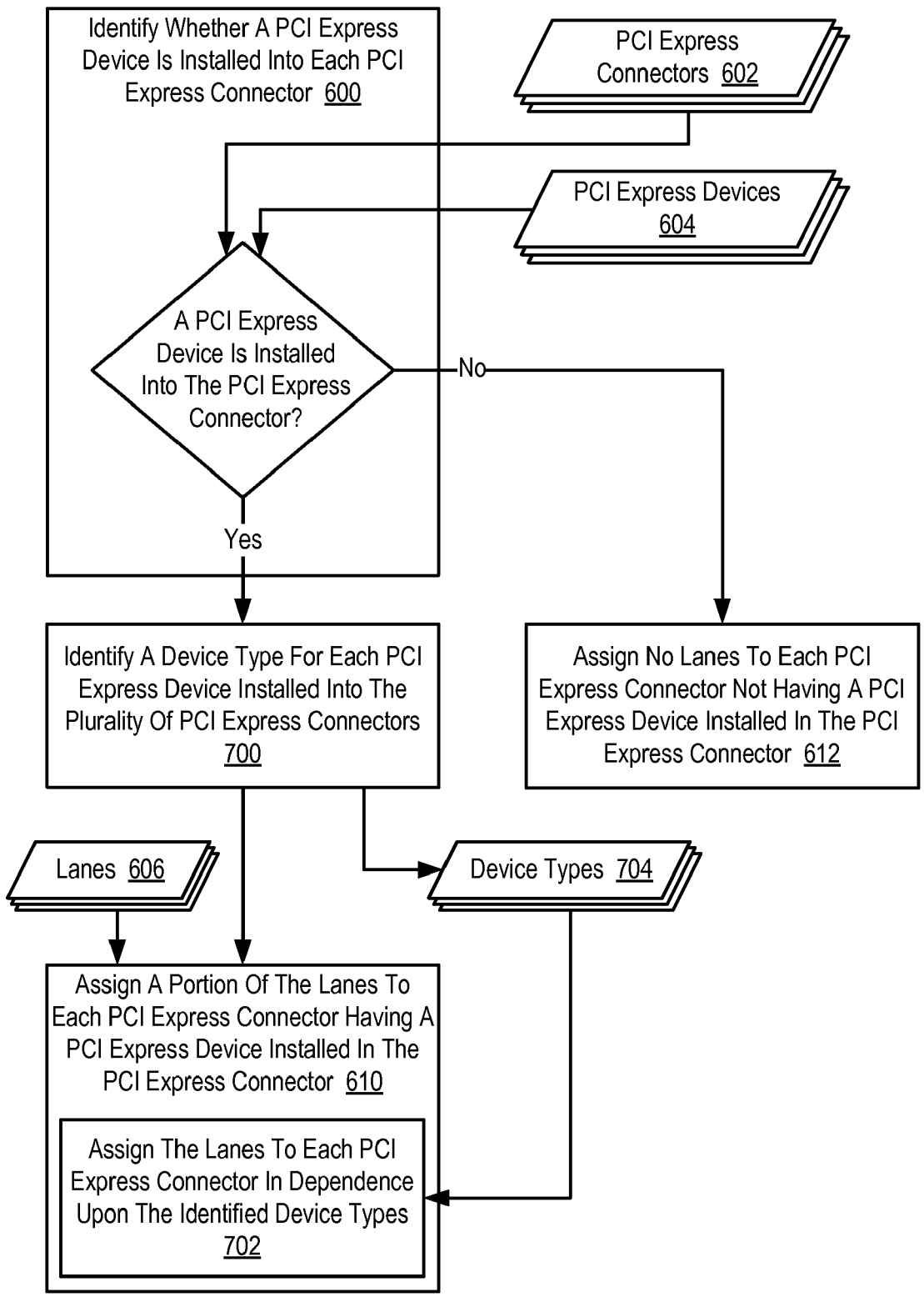
FIG. 7 sets forth a flow chart illustrating a further exemplary method for dynamically allocating lanes to a plurality of PCI Express connectors according to embodiments of the present invention.

The method of FIG. 7 is similar to the method of FIG. 6. The method of FIG. 7 is similar to the method of FIG. 6 in that the method of FIG. 7 includes identifying (600) whether a PCI Express device (604) is installed into each PCI Express connector (602), assigning (610) a portion of the lanes (606) to each PCI Express connector (602) having a PCI Express device (604) installed into the PCI Express connector (602), and assigning (612) no lanes (606) to each PCI Express connector (602) not having a PCI Express device (604) installed into the PCI Express connector (602). The example of FIG. 7 is also similar to the example of FIG. 6 in that the example of FIG. 7 includes PCI Express connectors (602), PCI Express devices (604), and lanes (606).

The method of FIG. 7 also includes identifying (700) a device type (704) for each PCI Express device (604) installed into the plurality of PCI Express connectors (602). The device types (704) of FIG. 7 represent the types of PCI Express devices installed into the PCI Express connectors (602). The device types (704) may specify types of devices such as, for example, video adapters, network adapters, storage adapters, computer bus adapters, and so on. In the example of FIG. 7, identifying (700) a device type (704) for each PCI Express device (604) installed into the plurality of PCI Express connectors (602) may be carried out using standard BIOS functions, for example, the FIND_PCI_CLASS_CODE. The standard BIOS functions useful in dynamically allocating lanes to a plurality of PCI Express connectors according to embodiments of the present invention may be described in BIOS specifications such as, for example, the BIOS Boot Specification developed by the Compaq Computer Corporation, Phoenix Technologies Ltd., and the Intel Corporation, and the Peripheral Component Interconnect ('PCI') BIOS Specification published by the PCI Special Interest Group.

In the method of FIG. 7, assigning (610) a portion of the lanes (606) to each PCI Express connector (602) having a PCI Express device (604) installed into the PCI Express connector (602) includes assigning (702) the lanes (606) to each PCI Express connector (602) in dependence upon the identified device types (704). Assigning (702) the lanes (606) to each PCI Express connector (602) in dependence upon the identified device types (704) may be carried out by may be carried out by configuring by a dynamic lane controller the transmission pathways between each of the PCI Express connectors having a PCI Express device installed in the connector and a PCI Express switch according to the identified device types (704). Consider, for example, a desktop computer system that includes a PCI Express switch providing seventeen lanes for allocation by a dynamic lane controller, two 16 lane PCI Express connectors, a PCI Express video card adapter installed in one of the PCI Express connectors, and a PCI Express network adapter installed in the other PCI Express connector. In such an example, assigning (702) the lanes (606) to each PCI Express connector (602) in dependence upon the identified device types (704) according to the method of FIG. 7 may be carried out by configuring by a dynamic lane controller thirty-two differential pairs to the connector into which the video card adapter is installed to provide sixteen lanes to the video card adapter and by configuring by a dynamic lane controller two differential pairs to the connector into which the network card adapter is installed to provide one lane to the network card adapter.

As mentioned above, assigning a portion of the lanes to each PCI Express connector having a PCI Express device installed into the PCI Express connector may be carried out by assigning the lanes to each PCI Express connector in dependence upon the allocation rules. For further explanation, therefore, FIG. 8 sets forth a flow chart illustrating a further exemplary method for dynamically allocating lanes to a plurality of PCI Express connectors according to embodiments of the present invention that includes assigning (802) the lanes (606) to each PCI Express connector (602) in dependence upon the allocation rules (804).

Figure 8:
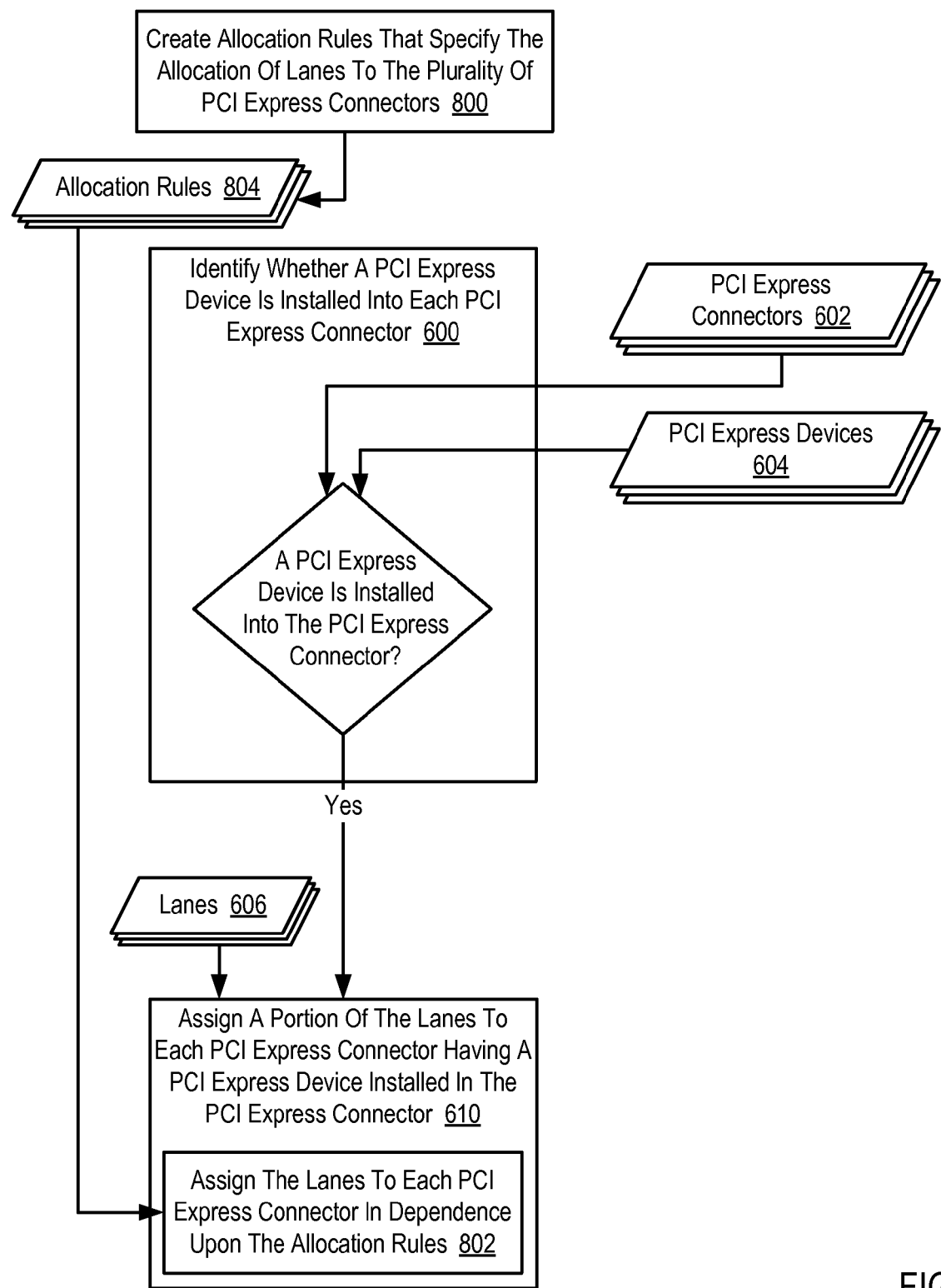
FIG. 8 sets forth a flow chart illustrating a further exemplary method for dynamically allocating lanes to a plurality of PCI Express connectors according to embodiments of the present invention.

The method of FIG. 8 is similar to the method of FIG. 6. The method of FIG. 8 is similar to the method of FIG. 6 in that the method of FIG. 8 includes identifying (600) whether a PCI Express device (604) is installed into each PCI Express connector (602), and assigning (610) a portion of the lanes (606) to each PCI Express connector (602) having a PCI Express device (604) installed into the PCI Express connector (602). The example of FIG. 8 is also similar to the example of FIG. 6 in that the example of FIG. 8 includes PCI Express connectors (602), PCI Express devices (604), and lanes (606).

The method of FIG. 8 also includes creating (800) allocation rules (804) that specify the allocation of lanes (606) to the plurality of PCI Express connectors (602). The allocation rules (804) of FIG. 8 are instructions for allocating lanes (606) to the PCI Express connectors (602) of a computer system. Exemplary allocation rules (804) useful for dynamically allocating lanes to a plurality of PCI Express connectors according to embodiments of the present invention may include the following:

Allocate the maximum number of lanes possible to the PCI Express connector closest to the PCI Express switch,
Allocate at least forty percent of the lanes provided by a PCI Express switch to a video card, and
Allocate at least one lane to each PCI Express connector installed the computer system.

Creating (800) allocation rules (804) that specify the allocation of lanes (606) to the plurality of PCI Express connectors (602) may be carried out by storing, by a computer architect, allocation rules (804) into firmware accessible by a dynamic lane controller such as, for example, the dynamic lane controller described above with reference to FIG. 1. Using the allocation rules (804), a dynamic lane controller installed in a computer system may dynamically allocate lanes to a plurality of PCI Express connectors according to embodiments of the present invention when the computer boots up. Readers will note that the exemplary allocation rules described above are for explanation and not for limitation. In fact, any allocations rules as will occur to those of skill in the art may be useful for dynamically allocating lanes to a plurality of PCI Express connectors according to embodiment of the present invention.

In the method of FIG. 8, assigning (610) a portion of the lanes (606) to each PCI Express connector (602) having a PCI Express device (604) installed into the PCI Express connector (602) includes assigning (802) the lanes (606) to each PCI Express connector (602) in dependence upon the allocation rules (804). Assigning (802) the lanes (606) to each PCI Express connector (602) in dependence upon the allocation rules (804) according to the method of FIG. 8 may be carried out by configuring by a dynamic lane controller the transmission pathways between each of the PCI Express connectors having a PCI Express device installed in the connector and a PCI Express switch according to the allocation rules (804). Consider, for example, an allocation rule that specifies allocating at least one lane to each PCI Express connector installed in a computer system. Assigning (802) the lanes (606) to each PCI Express connector (602) in dependence upon the allocation rules (804) according to the method of FIG. 8 may be carried out by configuring by a dynamic lane controller transmission pathways between pins 14 and 15 of side B of each connector and the PCI Express switch and configuring by a dynamic lane controller transmission pathways between pins 16 and 17 of side A of each connector the PCI Express switch. Pins 14 and 15 of side B and pins 16 and 17 of side A of each PCI Express connector are the two pairs of pins providing a PCI Express device the first lane for data communications with the PCI Express switch.

As mentioned above, assigning a portion of the lanes to each PCI Express connector having a PCI Express device installed into the PCI Express connector may be carried out by assigning the lanes to each PCI Express connector in dependence upon the user allocation preferences. For further explanation, therefore, FIG. 9 sets forth a flow chart illustrating a further exemplary method for dynamically allocating lanes to a plurality of PCI Express connectors according to embodiments of the present invention that includes assigning (902) the lanes (606) to each PCI Express connector (602) in dependence upon the user allocation preferences (904).

Figure 9:
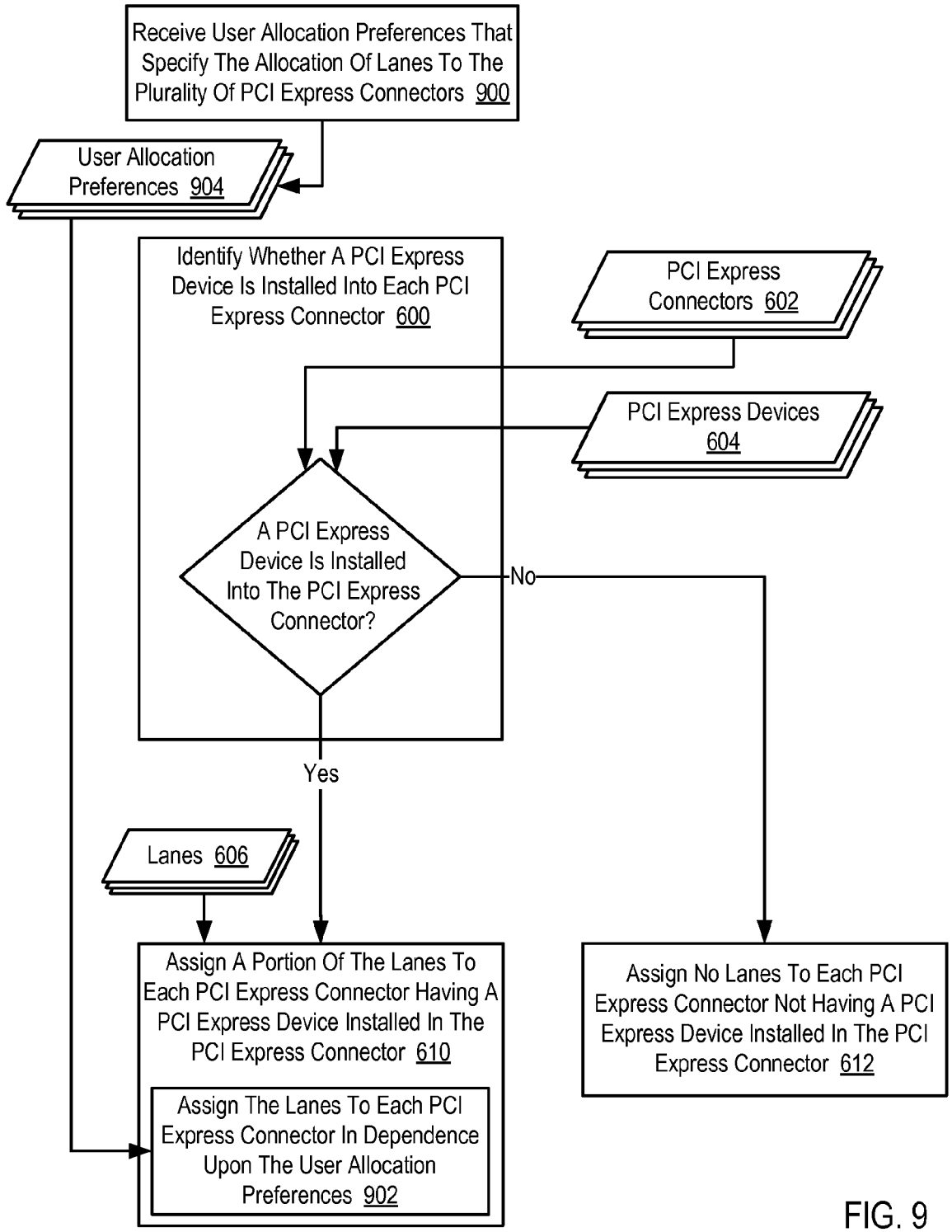
FIG. 9 sets forth a flow chart illustrating a further exemplary method for dynamically allocating lanes to a plurality of PCI Express connectors according to embodiments of the present invention.

The method of FIG. 9 is similar to the method of FIG. 6. The method of FIG. 9 is similar to the method of FIG. 6 in that the method of FIG. 9 includes identifying (600) whether a PCI Express device (604) is installed into each PCI Express connector (602), assigning (610) a portion of the lanes (606) to each PCI Express connector (602) having a PCI Express device (604) installed into the PCI Express connector (602), and assigning (612) no lanes (606) to each PCI Express connector (602) not having a PCI Express device (604) installed into the PCI Express connector (602). The example of FIG. 9 is also similar to the example of FIG. 6 in that the example of FIG. 9 includes PCI Express connectors (602), PCI Express devices (604), and lanes (606).

The method of FIG. 9 also includes receiving (900) user allocation preferences (904) that specify the allocation of lanes (606) to the plurality of PCI Express connectors (602). The user allocation preferences (904) are instructions from a user, such as, for example, a system administrator, for allocating lanes (606) to the PCI Express connectors (602) having PCI Express devices installed in the connectors. Exemplary user allocation preferences (904) useful in dynamically allocating lanes to a plurality of PCI Express connectors according to embodiments of the present invention may include:

Allocating one lane to one PCI Express connector of a computer system and allocating eight lanes to two other PCI Express connectors of the computer system, Allocating one lane to one PCI Express connector of a computer system and allocating four lanes to four other PCI Express connectors of the computer system, Allocating one lane to one PCI Express connector of a computer system and allocating sixteen lanes to one other PCI Express connectors of the computer system.

In the method of FIG. 9, receiving (900) user allocation preferences (904) that specify the allocation of lanes (606) to the plurality of PCI Express connectors (602) may be carried out by receiving user allocation preferences (904) from a user through a user interface such as, for example, the text-based or graphical user interface of a BIOS setup interface or a configuration interface of an operating system. Receiving (900) user allocation preferences (904) that specify the allocation of lanes (606) to the plurality of PCI Express connectors (602) may then be carried out by storing the user allocation preferences (904) into firmware accessible by a dynamic lane controller such as, for example, the dynamic lane controller described above with reference to FIG. 1. Using the user allocation preferences (904), a dynamic lane controller installed in a computer system may dynamically allocate lanes to a plurality of PCI Express connectors according to embodiments of the present invention when the computer reboots. Readers will note that the exemplary user allocation preferences described above are for explanation and not for limitation. In fact, any user allocation preferences as will occur to those of skill in the art may be useful for dynamically allocating lanes to a plurality of PCI Express connectors according to embodiment of the present invention.

In the method of FIG. 9, assigning (610) a portion of the lanes (606) to each PCI Express connector (602) having a PCI Express device (604) installed into the PCI Express connector (602) includes assigning (902) the lanes (606) to each PCI Express connector (602) in dependence upon the user allocation preferences (904). Assigning (902) the lanes (606) to each PCI Express connector (602) in dependence upon the user allocation preferences (904) according to the method of FIG. 9 may be carried out by configuring by a dynamic lane controller the transmission pathways between each of the PCI Express connectors having a PCI Express device installed in the connector and a PCI Express switch according to the user allocation preferences (904). Consider, for example, a user allocation preference that specifies allocating one lane to one PCI Express connector of a computer system and allocating eight lanes to two other PCI Express connectors of the computer system. Assigning (902) the lanes (606) to each PCI Express connector (602) in dependence upon the user allocation preferences (904) according to the method of FIG. 9 may be carried out by configuring by a dynamic lane controller four transmission pathways between one PCI Express connector and a PCI Express switch to provide one lane for data communications and by configuring by a dynamic lane controller thirty-two transmission pathways between two other PCI Express connectors and the PCI Express switch to provide two sets of eight lanes for data communications.

As mentioned above, assigning a portion of the lanes to each PCI Express connector having a PCI Express device installed into the PCI Express connector may be carried out by assigning the lanes to each PCI Express connector in dependence upon the historic data traffic. For further explanation, therefore, FIG. 10 sets forth a flow chart illustrating a further exemplary method for dynamically allocating lanes to a plurality of PCI Express connectors according to embodiments of the present invention that includes assigning (1002) the lanes (606) to each PCI Express connector (602) in dependence upon the historic data traffic (1004).

Figure 10:
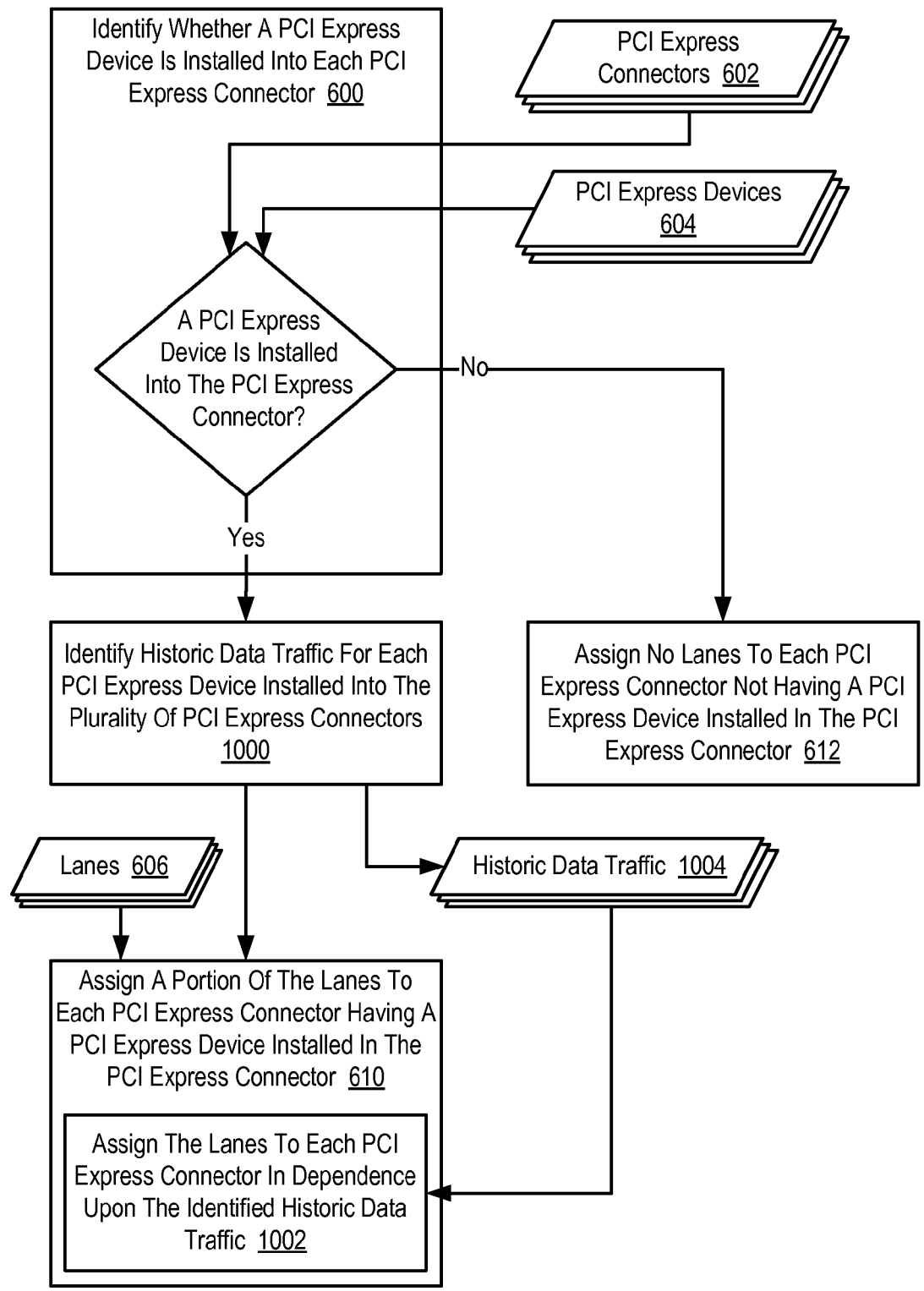
FIG. 10 sets forth a flow chart illustrating a further exemplary method for dynamically allocating lanes to a plurality of PCI Express connectors according to embodiments of the present invention.

The method of FIG. 10 is similar to the method of FIG. 6. The method of FIG. 10 is similar to the method of FIG. 6 in that the method of FIG. 10 includes identifying (600) whether a PCI Express device (604) is installed into each PCI Express connector (602), assigning (610) a portion of the lanes (606) to each PCI Express connector (602) having a PCI Express device (604) installed into the PCI Express connector (602), and assigning (612) no lanes (606) to each PCI Express connector (602) not having a PCI Express device (604) installed into the PCI Express connector (602). The example of FIG. 10 is also similar to the example of FIG. 6 in that the example of FIG. 10 includes PCI Express connectors (602), PCI Express devices (604), and lanes (606).

The method of FIG. 10 includes identifying (1000) historic data traffic (1004) for each PCI Express device (604) installed into the plurality of PCI Express connectors (602). The historic data traffic (1004) is a measurement of the quantity of data transmitted between a PCI Express device and a PCI Express switch in the past. The historic data traffic (1004) for a device may represent the raw number of data packets transmitted the last time the computer system was turned on, the average number of data packets transmitted per second the last time the computer system was turned on, the average of the raw number of data packets transmitted during the last three times the system was turned on, a weighted average of the raw number of data packets transmitted during the last three times the system was turned on, or any other measurement of the quantity of data transmitted between a PCI Express device and a PCI Express switch in the past, and so on. Identifying (1000) historic data traffic (1004) for each PCI Express device (604) installed into the plurality of PCI Express connectors (602) according to the method of FIG. 10 may be carried out by measuring by a dynamic lane controller, the number of data packets transmitted through each lane used for data communications between the PCI Express device and a PCI Express switch. Identifying (1000) historic data traffic (1004) for each PCI Express device (604) installed into the plurality of PCI Express connectors (602) according to the method of FIG. 10 may then be carried out by storing the measured number of packets transmitted between the PCI Express device and the PCI Express switch into firmware accessible by a dynamic lane controller such as, for example, the dynamic lane controller described above with reference to FIG. 1. Using the historic data traffic (1004), a dynamic lane controller installed in a computer system may dynamically allocate lanes to a plurality of PCI Express connectors according to embodiments of the present invention when the computer reboots.

In the method of FIG. 10, assigning (610) a portion of the lanes (606) to each PCI Express connector (602) having a PCI Express device (604) installed into the PCI Express connector (602) includes assigning (1002) the lanes (606) to each PCI Express connector (602) in dependence upon the historic data traffic (1004). Assigning (1002) the lanes (606) to each PCI Express connector (602) in dependence upon the historic data traffic (1004) according to the method of FIG. 10 may be carried out by calculating the number of lanes to allocate to each PCI Express connector having installed in it a PCI Express device according to the historic data traffic (1004) of each PCI Express device. Assigning (1002) the lanes (606) to each PCI Express connector (602) in dependence upon the historic data traffic (1004) according to the method of FIG. 10 may then be carried out by configuring by a dynamic lane controller the transmission pathways between each of the PCI Express connectors having a PCI Express device installed in the connector and a PCI Express switch according to the calculated number of lanes for each PCI Express device.

For an example of assigning (1002) the lanes (606) to each PCI Express connector (602) in dependence upon the historic data traffic (1004), consider a computer system having a PCI Express video adapter installed in one PCI Express connector of the system, a PCI Express network adapter installed in a second PCI Express connector of the system, and a PCI Express storage drive adapter installed in a third PCI Express connector of the system. Consider further that the historic data traffic (1004) stores the average number of data packets transmitted per second between each PCI Express device and the PCI Express switch the last time the computer system was turned on. The historic data traffic (1004) for the video adapter is 100,000 packets per second, the historic data traffic (1004) for the network adapter is 25,000 packets per second, and the historic data traffic (1004) for the storage drive adapter is 25,000 packets per second. Calculating the number of lanes to allocate to each PCI Express connector having installed in it a PCI Express device according to the historic data traffic (1004) of each PCI Express device as follows:

Video Adapter: $L_V=L_T*(D_V+D_N+D_s)\div D_V=16$ lanes*(100,000 packets per second+25,000 packets per second+25,000 packets per second)÷100,000 packets per second=8 lanes, Network Adapter: $L_N=L_T*(D_V+D_N+Ds)\div D_N=16$ lanes* (100,000 packets per second+25,000 packets per second+25,000 packets per second)÷25,000 packets per second=4 lanes, Storage Drive Adapter: $L_s=L_T*(D_V+D_N+D_s)\div D_s=16$ lanes*(100,000 packets per second+25,000 packets per second+25,000 packets per second)÷25,000 packets per second=4 lanes, where $L_T$ is the total number of lanes provided by a PCI Express switch, $L_V$ is the number of lanes allocated to a PCI Express connector having installed in it the video adapter, $L_N$ is the number of lanes allocated to a PCI Express connector having installed in it the network adapter, $L_s$ is the number of lanes allocated to a PCI Express connector having installed in it the storage drive adapter, $D_V$ is the historic data traffic for the video adapter, $D_N$ is the historic data traffic for the video adapter, and $D_s$ is the historic data traffic for the video adapter. Readers will note that the exemplary calculations described above are for explanation and not for limitation. Other calculations as will occur to those of skill in the art may be useful for dynamically allocating lanes to a plurality of PCI Express connectors according to embodiment of the present invention.

Readers will recall from above that each lane is implemented using four transmission pathways. Continuing with the example above, therefore, configuring by a dynamic lane controller the transmission pathways between each of the PCI Express connectors having a PCI Express device installed in the connector and a PCI Express switch according to the calculated number of lanes for each PCI Express device may be carried out by configuring thirty-two transmission pathways to the PCI Express connector having installed in it the video adapter, sixteen transmission pathways to the PCI Express connector having installed in it the network adapter, and sixteen transmission pathways to the PCI Express connector having installed in it the storage drive adapter.

Exemplary embodiments of the present invention are described largely in the context of a fully functional computer system for dynamically allocating lanes to a plurality of PCI Express connectors. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for dynamically allocating lanes to a plurality of PCI Express connectors, the method comprising:

identifying whether a PCI Express device is installed into each PCI Express connector;

identifying historic data traffic for each PCI Express device installed into the plurality of PCI Express connectors; and assigning a portion of the lanes to each PCI Express connector having a PCI Express device installed into the PCI Express connector including assigning the lanes to each PCI Express connector in dependence upon the historic data traffic.

2. The method of claim 1 further comprising:

identifying a device type for each PCI Express device installed into the plurality of PCI Express connectors; and wherein assigning a portion of the lanes to each PCI Express connector having a PCI Express device installed into the PCI Express connector further comprises assigning the lanes to each PCI Express connector in dependence upon the identified device types.

3. The method of claim 1 further comprising:

creating allocation rules that specify the allocation of lanes to the plurality of PCI Express connectors; and wherein assigning a portion of the lanes to each PCI Express connector having a PCI Express device installed into the PCI Express connector further comprises assigning the lanes to each PCI Express connector in dependence upon the allocation rules.

4. The method of claim 1 further comprising:

receiving user allocation preferences that specify the allocation of lanes to the plurality of PCI Express connectors; and wherein assigning a portion of the lanes to each PCI Express connector having a PCI Express device installed into the PCI Express connector further comprises assigning the lanes to each PCI Express connector in dependence upon the user allocation preferences.

* * * * *